United States Patent
Ozeki

(10) Patent No.: US 11,105,228 B2
(45) Date of Patent: *Aug. 31, 2021

(54) MOUNTING STRUCTURE OF OIL CONTROL VALVE UNIT AND MOTORCYCLE

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 516 days.

This patent is subject to a terminal disclaimer.

(21) Appl. No.: 15/958,656

(22) Filed: Apr. 20, 2018

(65) Prior Publication Data

US 2018/0313235 A1 Nov. 1, 2018

(30) Foreign Application Priority Data

Apr. 27, 2017 (JP) .............................. JP2017-087922

(51) Int. Cl.
*F01L 1/344* (2006.01)
*F01L 13/00* (2006.01)
(Continued)

(52) U.S. Cl.
CPC ............ *F01L 1/3442* (2013.01); *B62K 11/04* (2013.01); *F01L 13/00* (2013.01);
(Continued)

(58) Field of Classification Search
CPC ...................... F01L 13/00; F01L 1/3442; F01L 2001/34433; F01L 2001/34496;
(Continued)

(56) References Cited

U.S. PATENT DOCUMENTS 8,770,160 B2* 7/2014 Maehara ................. F16D 21/06
123/90.12
10,689,052 B2* 6/2020 Ozeki ................... F16H 57/031
(Continued)

FOREIGN PATENT DOCUMENTS

EP 2 169 187 A1 7/2009
EP 2 634 386 A1 2/2013
(Continued)

OTHER PUBLICATIONS

Extended European Search Report dated Oct. 16, 2018, issued by the European Patent Office in corresponding application EP 18169465.4.

(Continued)

*Primary Examiner* — Minnah L Seoh
*Assistant Examiner* — Maurice L Williams
(74) *Attorney, Agent, or Firm* — Stein IP, LLC

(57) ABSTRACT

There is provided a mounting structure of an oil control valve unit configured to control a hydraulic pressure to a variable valve timing device of an engine. The engine is supported by a vehicle body frame. A heat exchanger is mounted in front of the engine. The oil control valve unit is mounted at a side of the engine. A part of the vehicle body frame is arranged between the oil control valve unit and the heat exchanger in a front and rear direction.

15 Claims, 11 Drawing Sheets

(51) Int. Cl.
   *B62K 11/04*        (2006.01)
   *F01L 1/053*        (2006.01)
(52) U.S. Cl.
   CPC .............. *F01L 2001/0537* (2013.01); *F01L 2001/3443* (2013.01); *F01L 2001/34433* (2013.01); *F01L 2001/34496* (2013.01)
(58) Field of Classification Search
   CPC ....... F01L 2001/0537; F01L 2001/3443; B62J 41/00; B62K 11/02; B62K 11/04
   See application file for complete search history.

(56) References Cited

U.S. PATENT DOCUMENTS

| | | | |
|---|---|---|---|
| 2006/0065581 A1 | 3/2006 | Kazaoka et al. | 210/110 |
| 2006/0131092 A1* | 6/2006 | Tsujii | B62K 25/04 |
| | | | 180/219 |
| 2010/0077978 A1 | 4/2010 | Nakashima et al. | 123/90.16 |
| 2010/0300795 A1 | 12/2010 | Adachi et al. | 180/291 |
| 2013/0015634 A1 | 1/2013 | Yasuda et al. | 280/284 |
| 2013/0220721 A1* | 8/2013 | Matsuda | B60L 50/66 |
| | | | 180/220 |
| 2014/0265230 A1* | 9/2014 | Oikawa | B62K 11/06 |
| | | | 280/281.1 |
| 2015/0107923 A1 | 4/2015 | Inayama | |
| 2017/0101928 A1 | 4/2017 | Oda | |

FOREIGN PATENT DOCUMENTS

| | | |
|---|---|---|
| JP | 2006-118497 A | 5/2006 |
| JP | 2008-25539 A | 2/2008 |
| JP | 2010-84635 A | 4/2010 |
| JP | 2012-47073 A | 3/2012 |
| JP | 5345448 B2 | 8/2013 |
| JP | 2017-75548 A | 4/2017 |

OTHER PUBLICATIONS

Japanese Office Action dated Nov. 24, 2020, issued by the Japanese Patent Office in corresponding application JP 2017-087922.

* cited by examiner

REAR SIDE ← → FRONT SIDE

REAR SIDE ← → FRONT SIDE

UPPER SIDE
(OUTSIDE OF CYLINDER)

LOWER SIDE
(INSIDE OF CYLINDER)

MOUNTING STRUCTURE OF OIL CONTROL VALVE UNIT AND MOTORCYCLE

CROSS-REFERENCE TO RELATED APPLICATIONS

The disclosure of Japanese Patent Application No. 2017-087922 filed on Apr. 27, 2017, including specification, drawings and claims is incorporated herein by reference in its entirety.

TECHNICAL FIELD

The present invention relates to a mounting structure of an oil control valve unit configured to control a hydraulic pressure to a variable valve timing device, and a motorcycle.

BACKGROUND

In recent years, engines in which a variable valve timing device configured to control valve timings of an intake valve and an exhaust valve in correspondence to a driving state of an engine is mounted for high output, low-fuel consumption and low exhaust gas have been increasingly used. In this type of engines, an engine has been known in which a hydraulic pressure to the variable valve timing device is controlled with an oil control valve unit provided between a cylinder head and a radiator (for example, refer to Patent Document 1). The oil controlled by the oil control valve unit is supplied to an advance chamber and a retard chamber of the variable valve timing device, and a rotation phase of a camshaft relative to a crankshaft is changed, so that the valve timing is adjusted.

Patent Document 1: Japanese Patent No. 5345448B

However, according to Patent Document 1, since the oil control valve unit is mounted in the vicinity of the radiator (heat exchanger), operation characteristics of the oil control valve unit are susceptible to heat from the radiator. Further, since the oil control valve unit is mounted to protrude laterally from the radiator so that it can be exposed to traveling wind, it is not possible to protect the oil control valve unit from flying stones in front of a vehicle body.

SUMMARY

It is therefore one of objects of the present invention to provide a mounting structure of an oil control valve unit capable of suppressing operation characteristics of the oil control valve unit from being deteriorated due to an increase in temperature and protecting the oil control valve unit from flying stones in front of a vehicle body, and a motorcycle.

According to an aspect of the embodiments of the present invention, there is provided a mounting structure of an oil control valve unit configured to control a hydraulic pressure to a variable valve timing device of an engine, wherein the engine is supported by a vehicle body frame, a heat exchanger is mounted in front of the engine, the oil control valve unit is mounted at a side of the engine, and a part of the vehicle body frame is arranged between the oil control valve unit and the heat exchanger in a front and rear direction.

According to the mounting structure of the oil control valve unit of one aspect of the present invention, the part of the vehicle body frame is positioned between the heat exchanger and the oil control valve unit, and heat from the heat exchanger is shielded by the part of the vehicle body frame, so that operation characteristics of the oil control valve unit are suppressed from being deteriorated due to an increase in temperature. Also, the oil control valve unit is protected from flying stones in front of the vehicle body by the part of the vehicle body frame.

DETAILED DESCRIPTION OF THE EMBODIMENTS

Figure 1:
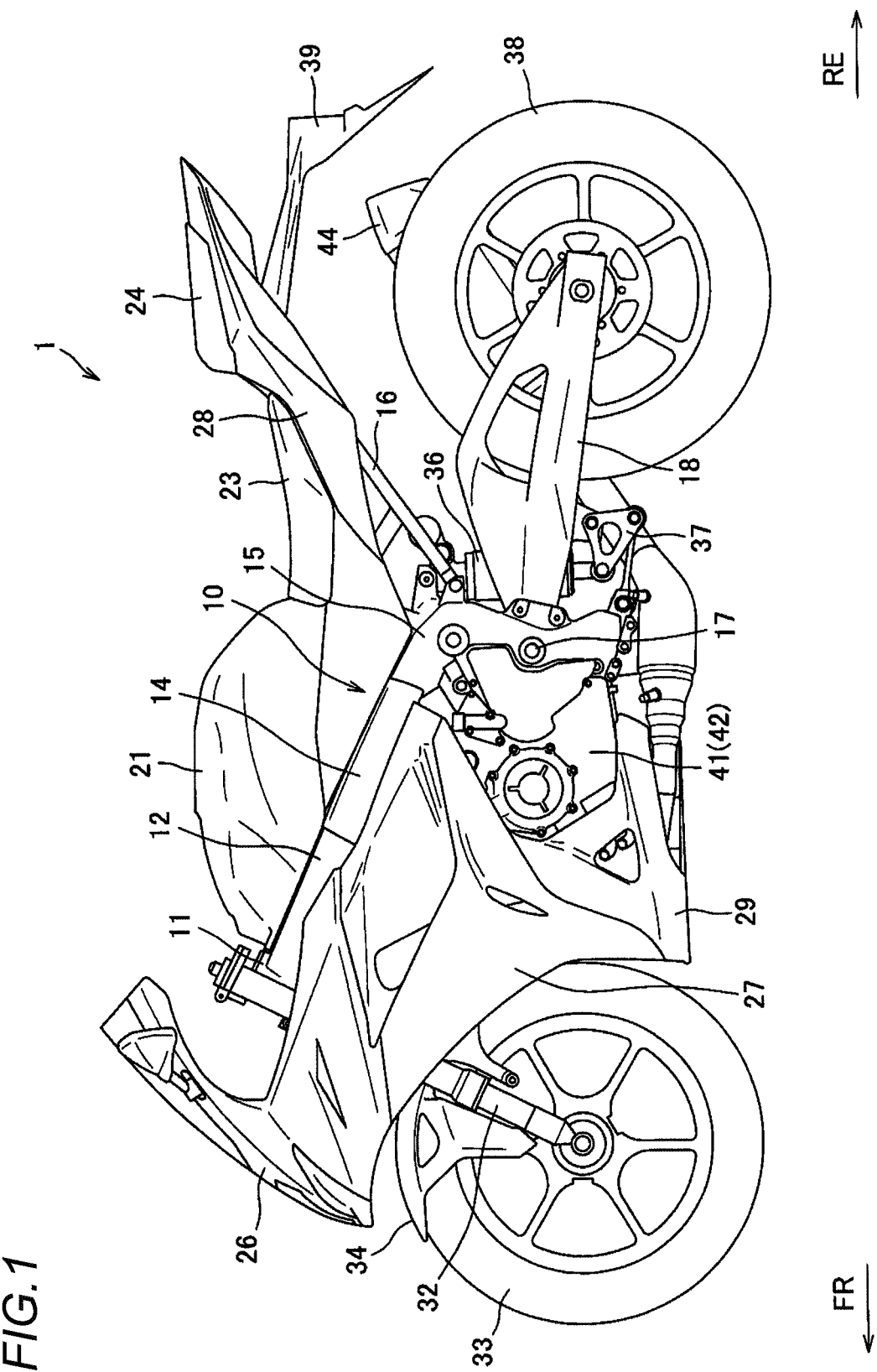
FIG. 1 is a left side view of a motorcycle of an illustrative embodiment.

Hereinafter, an illustrative embodiment will be described in detail with reference to the accompanying drawings. Herein, an example where a mounting structure of an oil control valve unit of the illustrative embodiment is applied to a sport-type motorcycle will be described. However, the target to which the present invention is applied is not limited thereto, and can be appropriately changed. For example, the mounting structure of the oil control valve unit can be applied to other types of motorcycles. FIG. 1 is a left side view of the motorcycle of the illustrative embodiment. In the drawings, the front of the vehicle body is denoted with an arrow FR, the rear of the vehicle body is denoted with an arrow RE, the left of the vehicle body is denoted with L, and the right of the vehicle body is denoted with R.

As shown in FIG. 1, a motorcycle 1 is configured by mounting a variety of components such as an engine 41, an electric system and the like to a twin spar-type vehicle body frame 10 made by aluminum casting. A main frame 12 of the vehicle body frame 10 is branched rightward and leftward from a head pipe 11 and extends rearward. The pair of right and left main frames 12 is bent to turn around toward the rear of the engine 41, and a rear side of the engine 41 is supported at rear parts (body frames 15) of the main frames 12. A down frame 13 (refer to FIG. 2) of the vehicle body frame 10 is branched rightward and leftward from the head pipe 11 and extends downward. A front side of the engine 14 is supported at lower parts of the pair of right and left down frames 13.

A part of the front part of the main frame 12 is configured as a tank rail 14, and a fuel tank 21 is mounted on the tank rail 14. The rear part of the main frame 12 is configured as a body frame 15. The body frame 15 is formed at a substantially intermediate position thereof in a vertical direction with a swing arm pivot 17 configured to swingably support a swing arm 18. A seat rail (not shown) and a back stay 16 extending rearward are provided above the body frame 15. The seat rail is provided thereon with a rider seat 23 and a pillion seat 24 in the vicinity of the fuel tank 21.

The vehicle body frame 10 is mounted with a variety of covers as external packages of a vehicle body. For example, a front half part of the vehicle body is covered with a front cowl 26, a side surface of the vehicle body is covered with a side cowl 27. Also, the seat rail is covered with a rear cowl 28, and a front lower part of the engine 41 is covered with an under cowl 29. A pair of right and left front forks 32 is supported to be steerable to the head pipe 11 via a steering shaft (not shown). The front forks 32 have front suspensions for front wheel buffering embedded therein. A front wheel 33 is rotatably supported by lower parts of the front forks 32, and the upper of the front wheel 33 is covered with a front fender 34.

The swing arm 18 extends rearward from the swing arm pivot 17. A rear suspension 36 for rear wheel buffering is provided between the swing arm 18 and the body frame 15. The rear suspension 36 has one end supported by an upper end-side of the body frame 15 and the other end coupled to the swing arm 18 via a suspension link 37. A rear wheel 38 is rotatably supported by a rear end of the swing arm 18. The engine 41 and the rear wheel 38 are coupled via a deceleration mechanism. The power from the engine 41 is transmitted to the rear wheel 38 via the deceleration mechanism. The upper of the rear wheel 38 is covered with a rear fender 39 provided at a rear part of the rear cowl 28.

The engine 41 is configured by mounting a cylinder 43 (refer to FIG. 2) on an engine case 42 in which a crankshaft (not shown) of a parallel four-cylinder engine and the like are accommodated. The engine 41 is supported by the vehicle body frame 10, so that the rigidity of the entire vehicle body is secured. The air is taken into the engine 41 through an intake pipe (not shown), and the air and fuel are mixed and supplied to a combustion chamber by a fuel injection device. An exhaust gas after combustion is discharged from a muffler 44 via an exhaust pipe (not shown) extending rearward on a right surface of the engine 41.

For the engine 41 configured as described above, a variable valve timing system configured to control driving timings of an intake valve and an exhaust valve in correspondence to a driving state of the engine is adopted. In the variable valve timing system, the engine 41 is provided with an oil control valve unit. However, the oil control valve unit cannot be freely mounted. For example, a mounting space is limited due to diverse factors such as an influence of heat from the radiator, a pressure loss in an oil passage, interference upon mounting of the vehicle body frame 10, interference upon mounting of a cam chain in the engine 41, and the like.

Figure 2:
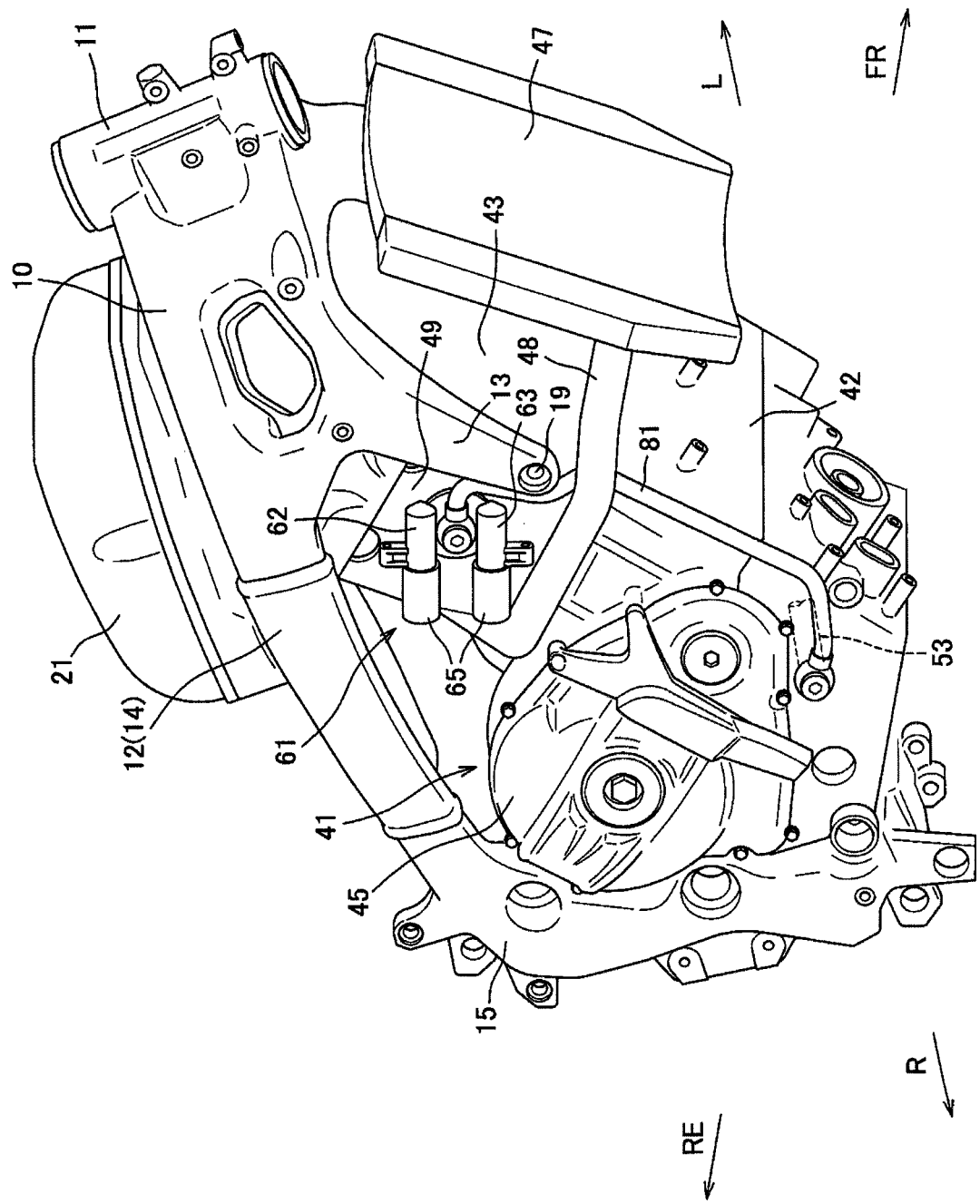
FIG. 2 is a peripheral perspective view of an engine of the illustrative embodiment.

As shown in FIG. 2, a radiator 47 is usually mounted in front of the engine 41, and operation characteristics of an oil control valve unit 61 are susceptible to heat from the radiator 47, depending on a mounting position of the oil control valve unit 61. Therefore, in the mounting structure of the oil control valve unit 61 of the illustrative embodiment, the heat from the radiator 47 is shielded in front of the oil control valve unit 61 by a part of the vehicle body frame 10. Also, since the traveling wind is also shielded by the vehicle body frame 10, the oil control valve unit 61 is exposed so as to avoid heat retention, as seen from rear, so that the air flow is not hindered.

Also, depending on the mounting position of the oil control valve unit 61, an oil passage in the engine 41 is complex, so that a pressure loss increases. As a result, it is not possible to supply the oil to the oil control valve unit 61 with a sufficient hydraulic pressure. Therefore, in the mounting structure of the oil control valve unit 61 of the illustrative embodiment, a main gallery 53 in the engine 41 and the oil control valve unit 61 are connected by an external piping 81, so that the oil is directly supplied from the main gallery 53 to the oil control valve unit 61. Also, the external piping 81 is configured to bypass an inside of the engine 41, so that a structure of the oil passage in the engine 41 is simplified.

Also, depending on the mounting position of the oil control valve unit 61, the oil control valve unit 61 becomes an obstacle upon mounting of the vehicle body frame 10 or upon a cam chain 56 (refer to FIG. 9) in the engine 41. Therefore, in the mounting structure of the oil control valve unit 61 of the illustrative embodiment, the oil control valve unit 61 is detachably mounted to an outer surface of the engine 41. After the vehicle body frame 10 is mounted to the engine 41 or the cam chain 56 in the engine 41 is mounted, the oil control valve unit 61 is then mounted, so that it is possible to secure a degree of mounting freedom of the oil control valve unit 61.

Figure 3:
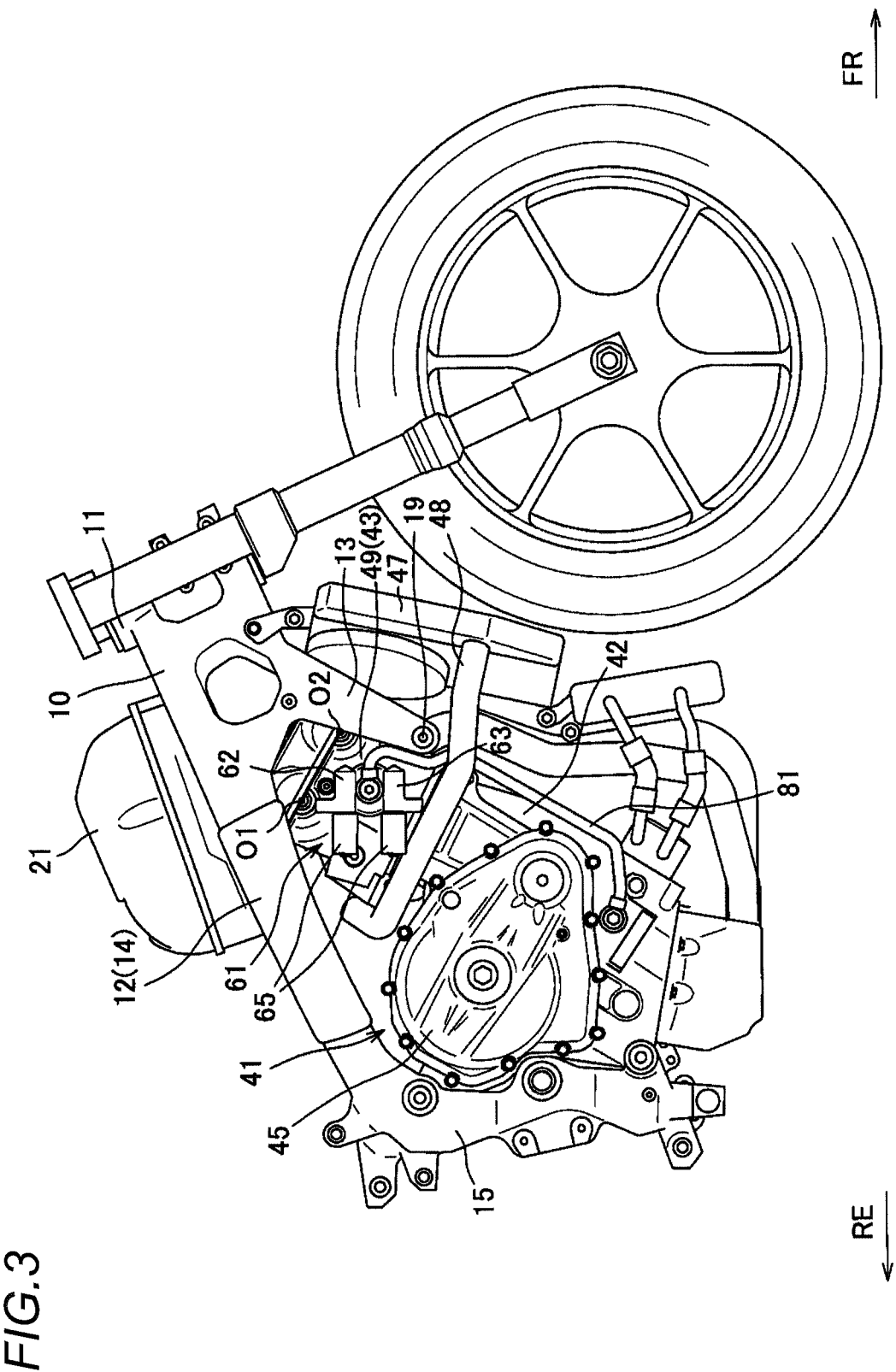
FIG. 3 is a right side view of a front half part of the motorcycle of the illustrative embodiment.
Figure 4:
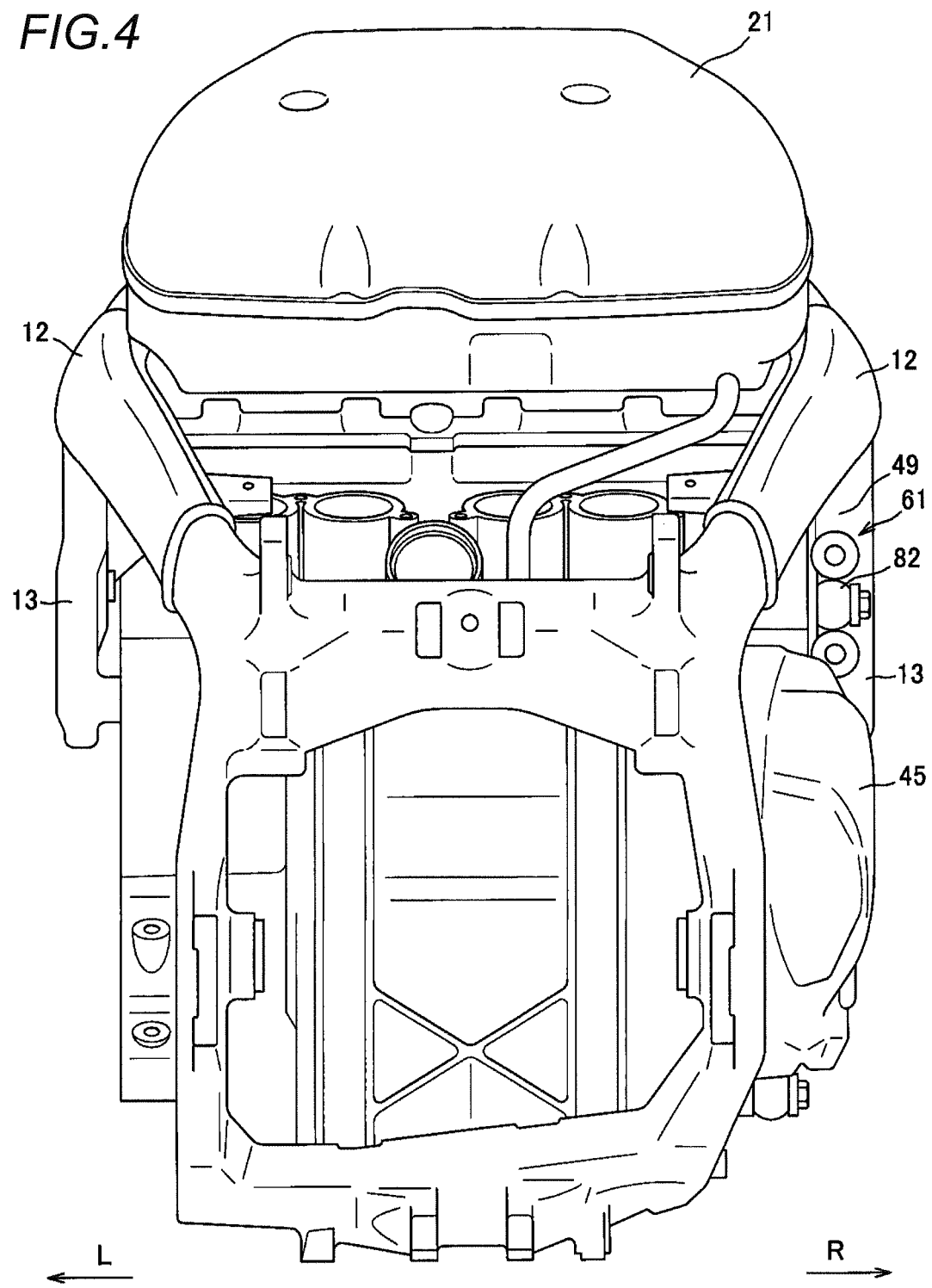
FIG. 4 is a peripheral rear view of the engine of the illustrative embodiment.
Figure 5A:
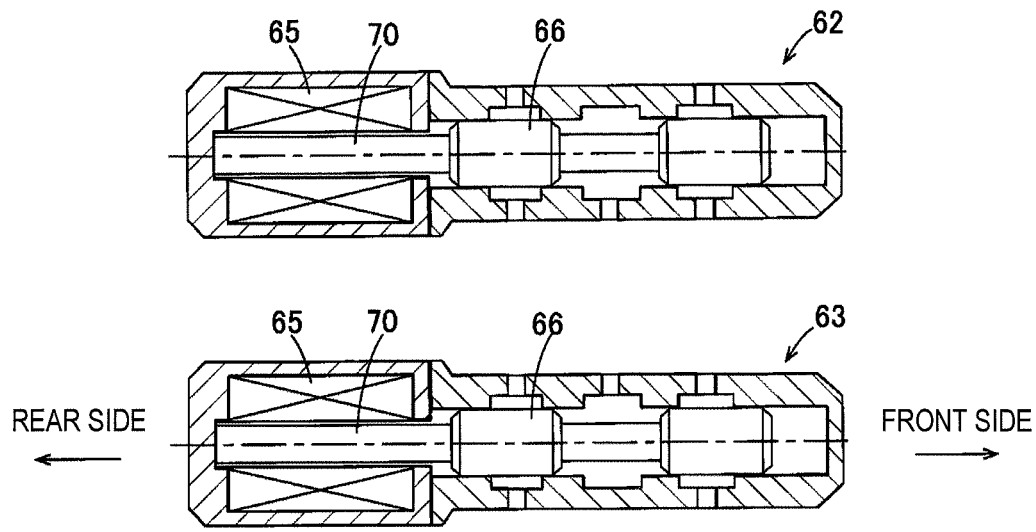
FIGS. 5A and 5B are pictorial views of an oil control valve unit of the illustrative embodiment.
Figure 5B:
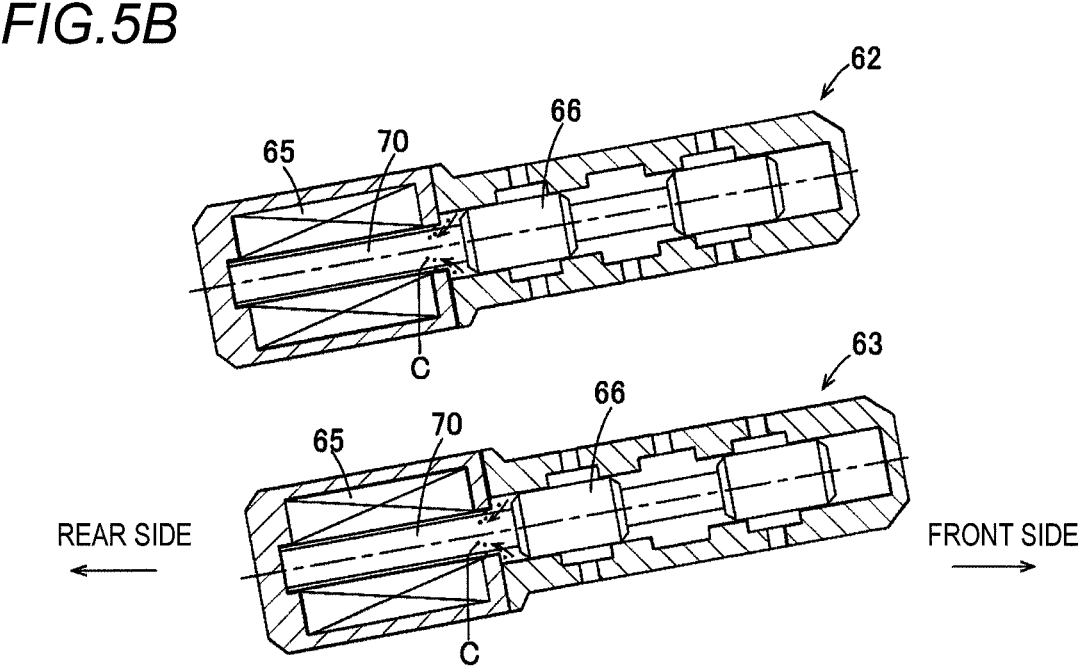

In the below, the mounting structure of the oil control valve unit of the illustrative embodiment is described with reference to FIGS. 2 to 5B. FIG. 2 is a peripheral perspective view of the engine of the illustrative embodiment. FIG. 3 is a right side view of a front half part of the motorcycle of the illustrative embodiment. FIG. 4 is a peripheral rear view of the engine of the illustrative embodiment. FIGS. 5A and 5B are pictorial views of the oil control valve unit of the illustrative embodiment. In the meantime, in FIGS. 2 to 5B, for convenience of descriptions, a variety of covers as external packages of the vehicle body are omitted.

As shown in FIGS. 2 and 3, the engine 41 is supported by the vehicle body frame 10, and the radiator 47 is mounted in front of the engine 41. As described above, the engine 41 is provided with the cylinder 43 on the engine case 42. The pair of right and left main frames 12 extends rearward from the head pipe 11 above the cylinder 43, and the pair of right and left down frames 13 extends downward from the head pipe 11 in front of the cylinder 43. The front part of the vehicle body frame 10 is bifurcated into the main frames 12 and the down frames 13, so that a mounting space 49 of the oil control valve unit 61 is secured at a side (right side) of the cylinder 43.

In this case, the down frames 13 are configured to support a front side of the engine 41. More specifically, the down frames 13 are configured to support a front side of the cylinder 43, and have a substantially triangular shape in which a width of the down frame 13 becomes wider gradually from a support position 19 to the engine 41 toward the head pipe 11. The cylinder 43 provided at the upper part of the engine 41 is supported with the down frames 13, so that it is possible to suppress the width of the down frame 13 from being widened in the front and rear direction and to secure the mounting space 49 of the oil control valve unit 61 at a side of the cylinder 43, unlike a structure in which a lower part of the engine 41 is supported with the down frames 13.

At a side of the engine 41, the oil control valve unit 61 is mounted in the mounting space 49 between the main frame 12 and the down frame 13, so that a space between the radiator 47 and the oil control valve unit 61 is blocked by the down frame 13. Thereby, the heat from the radiator 47 is shielded by the down frame 13, which is a part of the vehicle body frame 10, so that the deterioration of the operation characteristics of the oil control valve unit 61 due to an increase in temperature is suppressed. Also, the oil control valve unit 61 is positioned between the main frame 12 and the down frame 13, so that the oil control valve unit 61 is protected from flying stones in front of the vehicle body.

Since the front of the oil control valve unit 61 is blocked by the down frame 13, the influence of heat from the radiator 47 is suppressed. However, the traveling wind is difficult to collide with the oil control valve unit 61. For this reason, regarding a pair of front and rear IN cam axis center O1 and EX cam axis center O2 of the cylinder 43, the down frame 13 is configured to pass through a front side of the EX cam axis center O2 and the main frame 12 is configured to pass through a rear side of the IN cam axis center O1, so that the mounting space 49 of the oil control valve unit 61 is widened. The mounting space 49 is widened, so that the heat is difficult to be retained in the mounting space 49 and a surrounding temperature is thus lowered.

Also, a transmission is accommodated in the engine case 42, and the engine case 42 is provided with a transmission cover 45 to cover the transmission from a side. The transmission cover 45 bulges laterally, and the oil control valve unit 61 is mounted above the transmission cover 45. The oil control valve unit 61 is surrounded by the transmission cover 45, the main frame 12, and the down frame 13, and a space surrounded by the transmission cover 45, the main frame 12 and the down frame 13 is effectively utilized as the mounting space 49. Thereby, the oil control valve unit 61 is protected from the flying stones in front of the vehicle body by the down frame 13, and the oil control valve unit 61 is protected from flying stones below the vehicle body by the transmission cover 45.

An upper part of the transmission cover 45 is formed so that an interval with the oil control valve unit 61 becomes wider forward. The upper part of the transmission cover 45 is inclined obliquely downward toward the front, and a vertical interval between the upper part of the transmission cover 45 and the oil control valve unit 61 is increased. The transmission cover 45 and the oil control valve unit 61 are spaced from each other, so that the mounting space 49 of the oil control valve unit 61 can be widened, the heat is difficult to be retained in the mounting space 49 and the surrounding temperature is thus lowered. In this way, the mounting space 49 having a sufficient area is secured at the side of the engine 41 by the main frame 12, the down frame 13 and the transmission cover 45.

The pair of right and left main frames 12 extends obliquely rearward from the head pipe 11, and a facing interval of the main frames 12 is narrowed at the rear of the mounting space 49 of the oil control valve unit 61 (particularly, refer to FIG. 4). Also, the oil control valve unit 61 is mounted above the transmission cover 45. Thereby, the air flow is not hindered at the rear of the oil control valve unit 61 by the main frames 12 and the transmission cover 45. The oil control valve unit 61 is exposed, as seen from the rear. Therefore, upon the traveling, the heat flows rearward from the mounting space 49, so that the oil control valve unit 61 is effectively cooled.

Also, a radiator hose 48 extends rearward from the radiator 47, and the oil control valve unit 61 is mounted above the radiator hose 48 at the side of the engine 41. The cooling water is supplied from the radiator 47 to the engine 41 by the radiator hose 48, and the oil control valve unit 61 is cooled by the cooling water in the radiator hose 48. Since the radiator hose 48 traverses immediately below the oil control valve unit 61, the oil control valve unit 61 is protected from flying stones below the vehicle body by the radiator hose 48. Since the radiator hose 48 is formed of rubber or the like, the radiator hose 48 is difficult to be damaged due to the flying stones.

As shown in FIGS. 2 and 4, the oil control valve unit 61 overlaps the main frame 12, as seen from above, and overlaps the down frame 13 and the transmission cover 45, as seen from the front and rear direction. The oil control valve unit 61 overlaps the main frame 12, as seen from above, so that the main frame 12 functions as a rain shelter and a damage of the oil control valve unit 61 due to the rainwater is prevented. The oil control valve unit 61 overlaps the down frame 13 and the transmission cover 45, as seen from the front and rear direction, so that the oil control valve unit 61 is protected from flying stones in front of the vehicle body and below the vehicle body, and the effect of shielding the heat from the radiator 47 by the down frame 13 is increased.

The oil control valve unit 61 is mounted at a more inner side than all of the transmission cover 45, the main frame 12 and the down frame 13, as seen from the front and rear direction. The oil control valve unit 61 is protected from a shock upon turnover of the vehicle body and the other external shock by the transmission cover 45, the main frame 12 and the down frame 13. Also, the oil control valve unit 61 is accommodated in the vehicle body frame 10, as seen from the front and rear direction, so that an increase in entire vehicle width dimension of the vehicle body is suppressed. In the meantime, the inner side as seen from the front and rear direction may be a more inner side than the outermost surfaces of the transmission cover 45, the main frame 12 and the down frame 13.

Returning to FIGS. 2 and 3, the engine 41 is formed therein with the main gallery 53 to which the oil is to be supplied from an oil pump 52 (refer to FIG. 9), and the main gallery 53 and the oil control valve unit 61 are connected by one external piping 81. Thereby, the oil is directly supplied from the main gallery 53 in which the hydraulic pressure is high to the oil control valve unit 61 through the external piping 81. The oil is supplied from the main gallery 53 to the oil control valve unit 61 without via the oil passage in the engine 41, so that it is possible to suppress the pressure loss and to supply the oil of the high hydraulic pressure to the oil control valve unit 61.

The external piping 81 extends forward from the main gallery 53 below the transmission cover 45, turns around the transmission cover 45 from below and then extends upward. The external piping 81 passes through an inner side of the radiator hose 48, as seen from the front and rear direction, passes through between the oil control valve unit 61 and the down frame 13 and is then connected to the oil control valve unit 61. In this case, the oil control valve unit 61 is mounted at the rear of the EX cam axis center O2, and a mounting route of the external piping 81 is secured between the oil control valve unit 61 and the down frame 13. By this mounting route, the increase in entire vehicle width dimension of the vehicle body is suppressed, and the external piping 81 is shortened to suppress the pressure loss in the piping.

The external piping 81 passes through the inner side of the radiator hose 48, as seen from the front and rear direction, and passes through the inner side of the vehicle body frame 10, as seen from the front and rear direction, so that the external piping 81 is protected from a shock upon turnover of the vehicle body and the other external shock by the radiator hose 48 and the vehicle body frame 10. Since a part of the external piping 81 overlaps the down frame 13, as seen from the front and rear direction, and overlaps the radiator hose 48, as seen from below, the external piping 81 is protected from the flying stones in the front of the vehicle body and below the vehicle body by the down frame 13 and the radiator hose 48. In this way, the external piping 81 is also sufficiently protected from the shock and flying stones, like the oil control valve unit 61.

The oil control valve unit 61 is provided with an intake control valve 62 configured to control an intake-side valve timing and an exhaust control valve 63 configured to control an exhaust-side valve timing. The oil control valve unit 61 is connected with the external piping 81, and the intake control valve 62 and the exhaust control valve 63 are vertically spaced from each other with horizontal postures with a connection part of the external piping 81 being interposed therebetween. Since the intake control valve 62 and the exhaust control valve 63 are spaced from each other, the heat is difficult to be retained between the intake control valve 62 and the exhaust control valve 63.

Also, since the intake control valve 62 and the exhaust control valve 63 are vertically aligned, an increase in vehicle width dimension of a main body of the vehicle body is suppressed. Also, since the intake control valve 62 and the exhaust control valve 63 are longitudinally aligned with horizontal postures, both the control valves 62, 63 are evenly cooled by the air flow upon the traveling. That is, like a configuration where the intake control valve 62 and the exhaust control valve 63 are horizontally aligned with vertical postures, a situation where only a front control valve is cooled by the air flow and a rear control valve is difficult to be cooled does not occur.

As shown in FIG. 5A, the intake control valve 62 and the exhaust control valve 63 are a cylindrical solenoid valve, respectively, and are respectively divided into a solenoid side in which a solenoid 65 is accommodated and a valve spool side in which a valve spool 66 is accommodated. The solenoid 65 is a so-called cylindrical conductive coil, and is configured to generate a magnetic field by energization, thereby advancing and retreating the valve spool 66 coupled to an iron core 70 in the solenoid 65. The valve spool 66 is advanced and retreated, so that an oil path is switched in the intake control valve 62 and the exhaust control valve 63.

The intake control valve 62 and the exhaust control valve 63 are likely to generate heat by the energization of the solenoids 65, and the operation characteristics thereof are deteriorated due to increases in temperature of the solenoids 65. Therefore, in the illustrative embodiment, the solenoids 65-side of the intake control valve 62 and the exhaust control valve 63 face rearward. Since the solenoids 65 are spaced from the radiator 47, the heat generation of the solenoids 65 is suppressed, so that the deterioration of the operation characteristics of the solenoids 65 due to increases in temperature is suppressed. Also, axis centers of the solenoids 65 of the intake control valve 62 and the exhaust control valve 63 preferably face horizontally or obliquely upward toward the rear.

For example, as shown in a comparative example of FIG. 5B, when the axis centers of the solenoids 65 of the intake control valve 62 and the exhaust control valve 63 face obliquely downward toward the rear, foreign matters such as contaminations C generated at the valve spools 66-side are conveyed toward the solenoids 65-side by the oil. For this reason, the foreign matters such as contaminations C may be deposited at the solenoids 65-side. For this reason, in the illustrative embodiment of FIG. 5A, since axis centers of the solenoids 65 face horizontally or obliquely upward toward the rear (horizontally, in FIG. 5A), a situation where the foreign matters such as contaminations C generated at the valve spools 66-side enter and damage the solenoids 65-side is prevented.

Figure 6A:
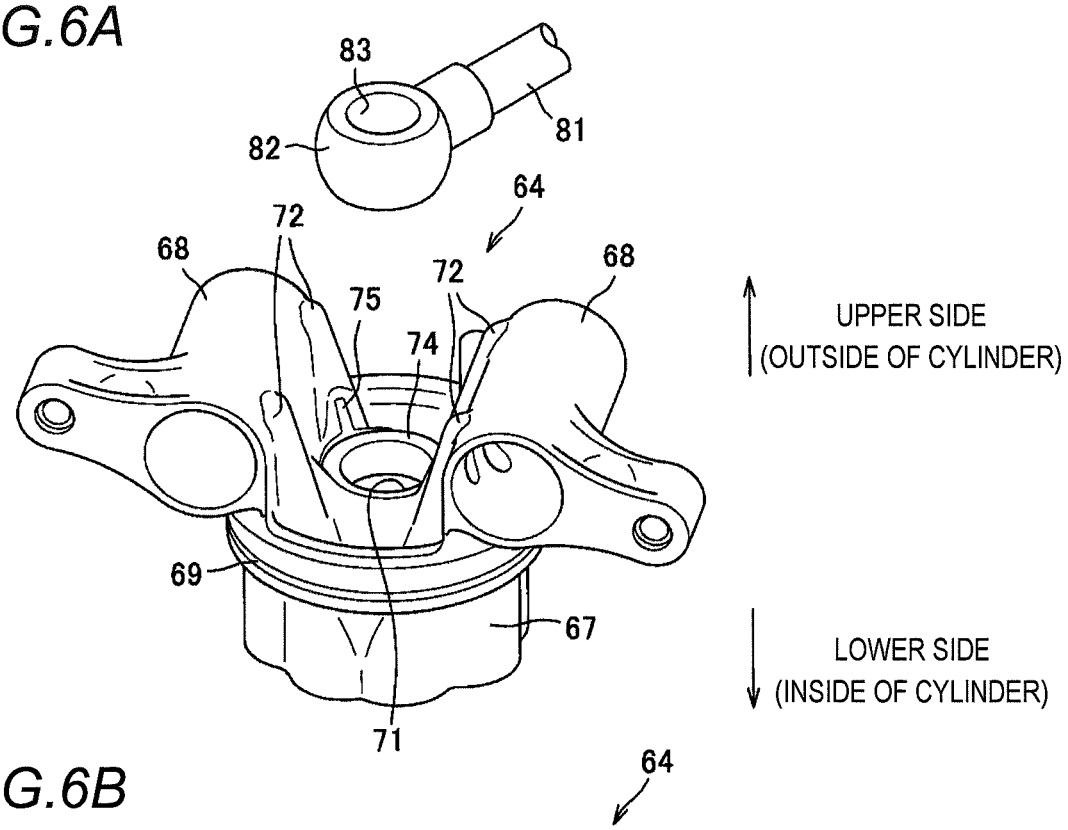
FIGS. 6A and 6B are a perspective view and a bottom view of a valve housing of the illustrative embodiment.
Figure 6B:
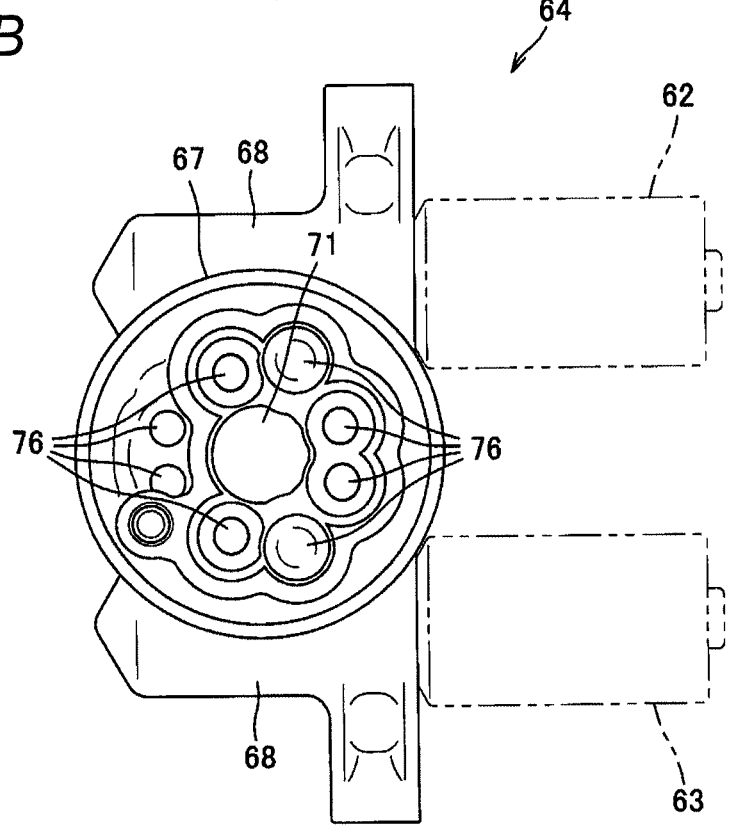
Figure 7:
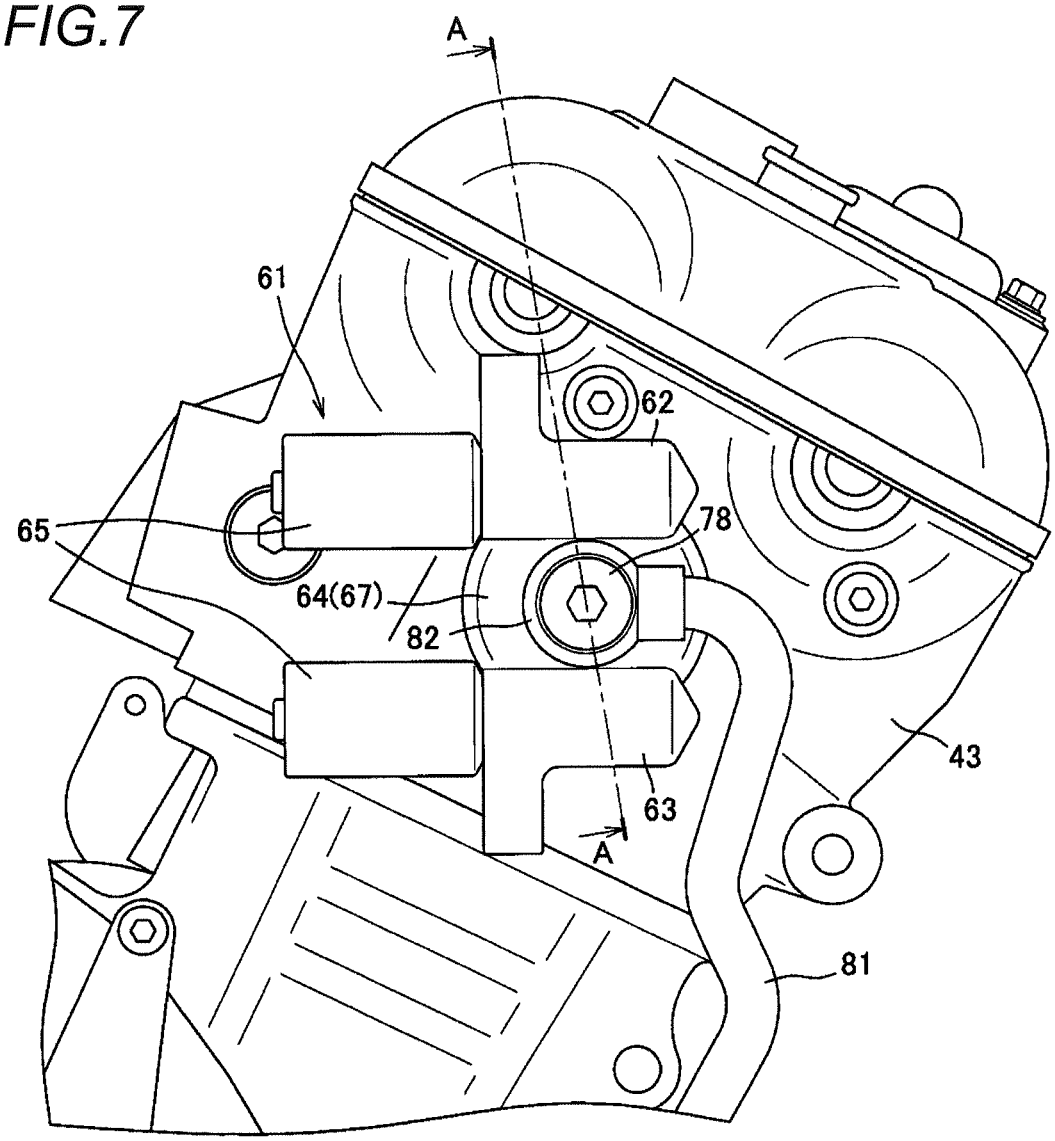
FIG. 7 is a side view of a cylinder of the illustrative embodiment.
Figure 8:
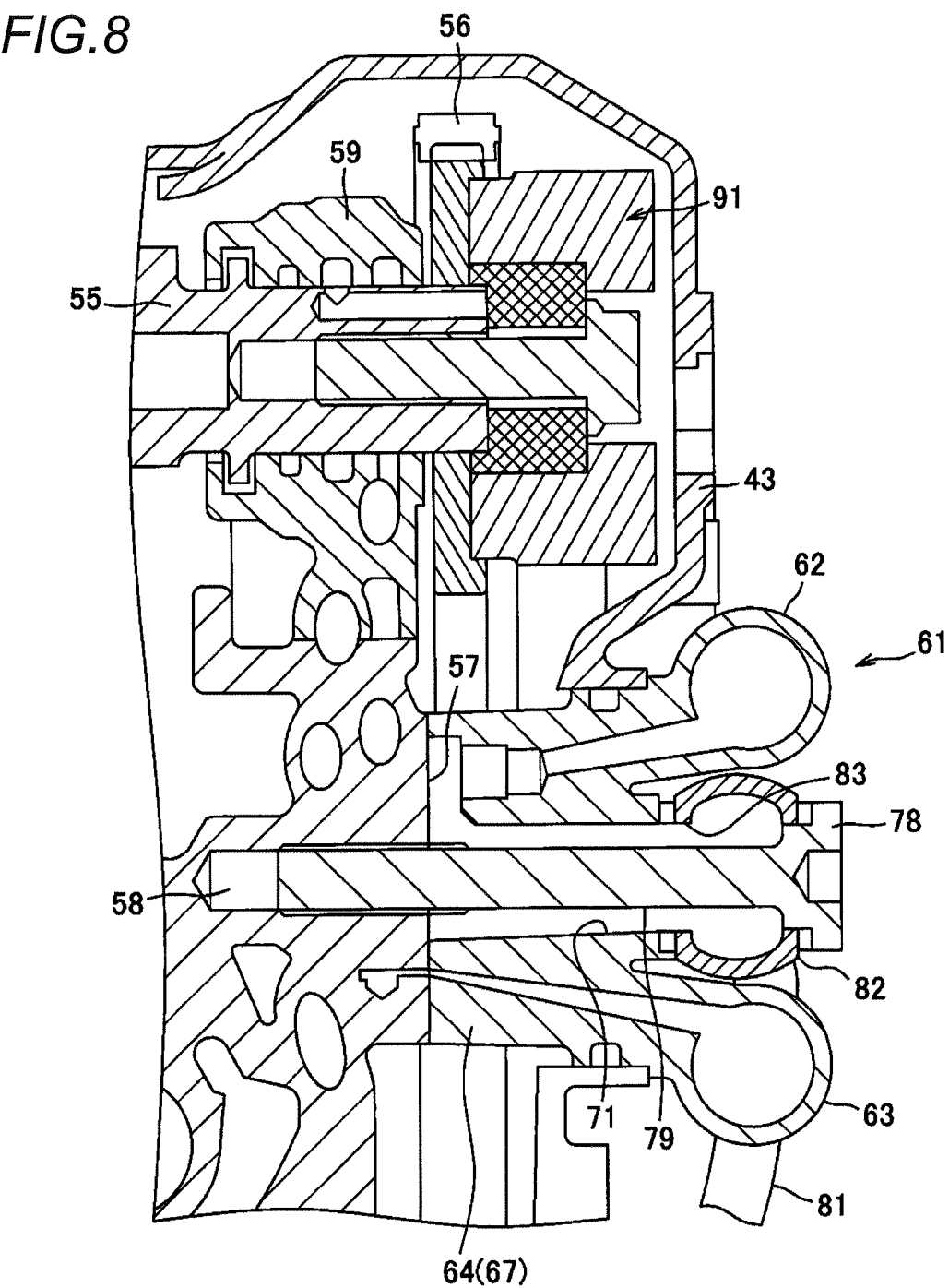
FIG. 8 is a sectional view taken along a line A-A of FIG. 7.

Subsequently, the oil control valve unit is described in detail with reference to FIGS. 6A to 8. FIGS. 6A and 6B are a perspective view and a bottom view of a valve housing of the illustrative embodiment. FIG. 7 is a side view of the cylinder of the illustrative embodiment. FIG. 8 is a sectional view taken along a line A-A of FIG. 7. Meanwhile, in FIG. 6B, for convenience of descriptions, the solenoids-side are shown with dashed-two dotted line.

As shown in FIG. 6A, a valve housing 64 of the oil control valve unit 61 is provided with a pair of support cases 68, in which the valve spools (not shown) are to be inserted, at an upper part of a housing main body 67 having a plurality of oil passages aligned annularly. The valve housing 64 is used with being inserted into an outer wall of the cylinder 43 (refer to FIG. 7), and an outer surface of the housing main body 67 is mounted with an O-ring 69 for sealing a gap between the outer wall of the cylinder 43 and the housing main body 67. Based on the O-ring 69 as a boundary, the housing main body 67-side is accommodated in the cylinder 43, and the pair of support cases 68-side protrudes outward from the cylinder 43.

The pair of support cases 68 is provided with horizontal postures on the upper part of the housing main body 67 of a vertical posture at positions that face each other with an opening 71 of the housing main body 67 being interposed therebetween. The support cases 68 and the housing main body 67 are reinforced with ribs 72 at four places around the opening 71, and the ribs 72 are formed therein with oil passages (not shown) configured to connect insides of the support cases 68 and an inside of the housing main body 67. The ribs 72 continue from vicinities of both ends of each of the cylindrical support cases 68 along the upper part of the housing main body 67, and are respectively inclined so that a lateral protrusion amount increases from the upper toward the lower. A space between the pair of support cases 68 is configured as a mounting space of a banjo joint 82, which is a circular ring-shaped joint and is provided at a leading end of the external piping 81, and an opening end of the housing main body 67 is formed with an annular seat surface 74 on which the banjo joint 82 is to be put.

Also, outer surfaces of the four ribs 72 of the valve housing 64 are formed with guide surfaces 75 configured to guide the banjo joint 82 to the seat surface 74. The respective guide surfaces 75 face each other with the opening 71 of the housing main body 67 being interposed therebetween, and are inclined so that a facing interval of the guide surfaces 75, which face each other with the opening 71 being interposed therebetween, becomes narrower from the upper toward the lower. The banjo joint 82 is slid and guided along the respective guide surfaces 75 so that a mounting hole 83 of the banjo joint 82 coincides with the opening 71 of the valve housing 64. In the meantime, although described in detail later, the banjo joint 82 and the valve housing 64 are mounted to the engine 41 from a side by a bolt 78 (refer to FIG. 7), and the external piping 81 and the oil passages of the valve housing 64 communicate with each other via the banjo joint 82.

As shown in FIG. 6B, the housing main body 67 is formed with a plurality of oil ports (oil channels) 76 so as to surround the opening 71. The respective oil ports 76 are an input port, an advance port, a retard port, and a drain port, and are connected to the intake control valve 62 and the exhaust control valve 63 supported by the pair of support cases 68. The communications of the respective ports are switched by driving of the intake control valve 62 and the exhaust control valve 63, so that the oil is supplied to an advance-side or a retard-side of a variable valve timing device 91 (refer to FIG. 8).

As shown in FIGS. 7 and 8, the oil control valve unit 61 is fixed to the cylinder 43 from a side by the bolt 78. In this case, a sidewall of the cylinder 43 opens in a circular shape, and the housing main body 67 of the valve housing 64 is inserted into the opening part. When the valve housing 64 is abutted to an inner wall 57 in the cylinder 43, the opening 71 of the housing main body 67 is positionally aligned with a screw hole 58 formed in the inner wall 57. Then, the banjo joint 82 and the valve housing 64 are fastened together by the bolt 78, so that the external piping 81 and the oil control valve unit 61 are mounted to the cylinder 43.

At this time, the mounting hole 83 of the banjo joint 82 is formed to have a diameter larger than a shaft part 79 of the bolt 78, so that an oil passage is formed by a gap between the mounting hole 83 of the banjo joint 82 and the shaft part 79 of the bolt 78. Also, the opening 71 of the valve housing 64 is formed to have a diameter larger than the shaft part 79 of the bolt 78, so that an oil passage is formed by a gap between the opening 71 of the valve housing 64 and the shaft part 79 of the bolt 78. The oil is supplied from the external piping 81 toward the intake control valve 62 and the exhaust control valve 63 through the oil passages formed around the shaft part 79 of the bolt 78.

The oil is distributed to the intake control valve 62 and the exhaust control valve 63 by using the gap between the mounting hole 83 of the banjo joint 82 and the shaft part 79 of the bolt 78 and the gap between the opening 71 of the valve housing 64 and the shaft part 79 of the bolt 78. The oil passages of the intake control valve 62 and the exhaust control valve 63 are connected to oil passages of a cam housing 59 configured to support camshafts 55 through the advance port and the retard port. The oil passages of the cam housing 59 are connected to hydraulic pressure chambers of an intake-side variable valve timing device 91 and an exhaust-side variable valve timing device 91 (refer to FIG. 9).

In this way, the oil passages extending from the external piping 81 to the intake-side variable valve timing device 91 and the exhaust-side variable valve timing device 91 are formed by the simple configuration of mounting the oil control valve unit 61 to the cylinder 43. In the meantime, the oil control valve unit 61 is mounted to pass through an inner side of a cam chain 56 configured to transmit power to the pair of front and rear camshafts 55 in the cylinder 43. The configuration of mounting a member to the inner side of the cam chain 56 is not preferable from a standpoint of the mounting workability. However, the oil control valve unit 61 is detachably mounted, so that the oil control valve unit 61 is not an obstacle upon the mounting of the cam chain 56.

More specifically, in case of the motorcycle 1 (refer to FIG. 1) and the like, a chain cover is integrated with the cylinder 43. Since it is not possible to demount only the chain cover from the cylinder 43, when a member is mounted at the inner side of the cam chain 56, the member becomes an obstacle upon mounting of the cam chain 56 to the engine 41. For this reason, in the illustrative embodiment, the oil control valve unit 61 is configured to be detachably mounted, and after the cam chain 56 is mounted to the engine 41, the valve housing 64 (the housing main body 67) of the oil control valve unit 61 is inserted to the inner side of the cam chain 56. Thereby, any interference does not occur upon the mounting of the cam chain 56, and a dead space of the inner side of the cam chain 56 is effectively used.

The valve housing 64 of the oil control valve unit 61 is configured to pass through the inner side of the cam chain 56, so that it is possible to mount the oil control valve unit 61 in the vicinity of the variable valve timing device 91. Therefore, the external piping 81 from the main gallery 53 (refer to FIG. 9) to the oil control valve unit 61 is lengthened, and an internal flow path of the engine 41 from the oil control valve unit 61 to the variable valve timing device 91 is shortened. Thereby, the oil is supplied with high hydraulic pressure into the oil control valve unit 61 by the external piping 81, and the pressure loss of the oil in the internal flow path of the engine 41 is suppressed to the minimum, so that it is possible to apply the high hydraulic pressure to the variable valve timing device 91.

Also, when the oil control valve unit 61 is mounted to the cylinder 43, the banjo joint 82 is mounted at a more inner side than the valve housing 64, as seen from the front and rear direction. Since the banjo joint 82 does not protrude more outward than the valve housing 64, as seen from the front and rear direction, an increase in vehicle width dimension due to the banjo joint 82 is suppressed. Also, the banjo joint 82 is mounted at a more inner side than all of the transmission cover 45, the main frame 12 and the down frame 13, as seen from the front and rear direction (refer to FIG. 4). Therefore, the banjo joint 82 is protected from a shock upon turnover of the vehicle body and the other external shock by the transmission cover 45, the main frame 12 and the down frame 13.

Also, the valve housing 64 is abutted to the inner wall 57 of the cylinder 43, so that the intake control valve 62 and the exhaust control valve 63 are spaced from the side surface of the cylinder 43. That is, the solenoids 65 of the oil control valve unit 61 are spaced from the side surface of the engine 41 in the vehicle width direction. For this reason, the solenoids 65 of the oil control valve unit 61 are not contacted to the side surface of the cylinder 43, and the increase in temperature of the solenoids 65 due to the heat of the cylinder 43 is suppressed. Therefore, the deterioration of the operation characteristics of the oil control valve unit 61 is effectively suppressed.

Figure 9:
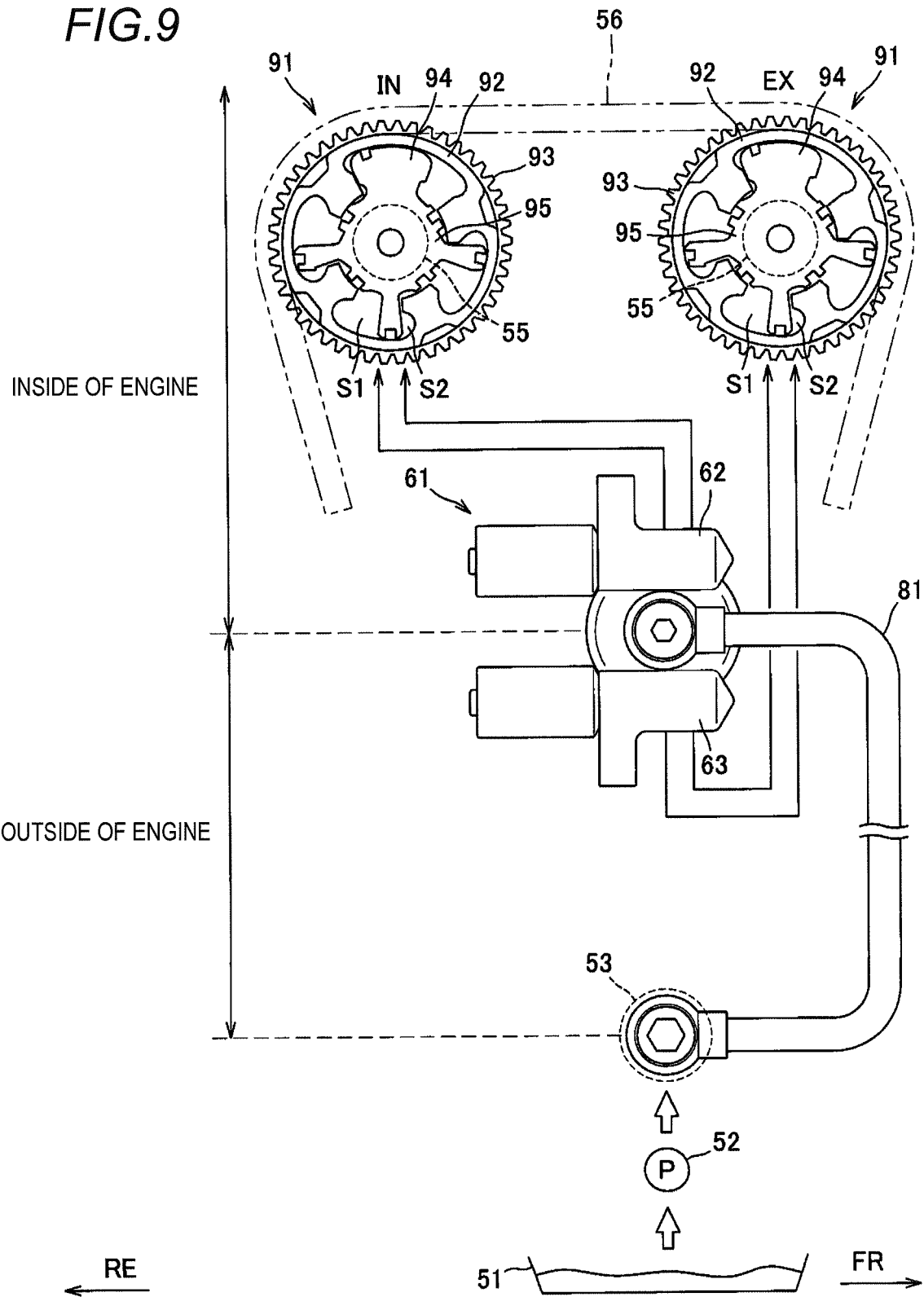
FIG. 9 is a pictorial view of a variable valve timing system of the illustrative embodiment.

Subsequently, the variable valve timing system is briefly described with reference to FIG. 9. FIG. 9 is a pictorial view of the variable valve timing system of the illustrative embodiment. In the meantime, although the intake-side and exhaust-side variable valve timing systems are described, the variable valve timing system may be provided at only the intake-side or the exhaust-side. Also, in FIG. 9, for convenience of descriptions, the cam chain is shown with the dashed-two dotted line.

As shown in FIG. 9, the variable valve timing system is to vary valve timings by changing rotation phases of the camshafts 55 relative to crankshafts (not shown), and includes the hydraulic pressure-type variable valve timing devices 91. The power from the crankshafts is transmitted to the camshafts 55 by the cam chain 56 via the variable valve timing devices 91. The variable valve timing device 91 is provided at one end portion of the camshaft 55, and is configured to transmit the power to the camshaft 55 via the oil supplied therein.

A case 92 of the variable valve timing device 91 is fixed to a sprocket 93 on which the cam chain 56 is put, and is configured to rotate integrally with the sprocket 93. The sprocket 93 is rotatably supported by one end portion of the camshaft 55 together with the case 92. Also, a rotor 95 having vanes 94 is fixed to one end portion of the camshaft 55, and is accommodated to be relatively rotatable inside the case 92. A plurality of hydraulic pressure chambers is formed inside the case 92, and each vane 94 of the rotor 95 is accommodated in each hydraulic pressure chamber. Each hydraulic pressure chamber is partitioned into an advance chamber S1 and a retard chamber S2 by each vane 94.

The advance chamber S1 and the retard chamber S2 are configured to communicate with the oil paths formed in the camshaft 55 and the cam housing 59 (refer to FIG. 8). When a volume of the advance chamber S1 is increased by the hydraulic pressure, the rotor 95 is rotated relative to the case 92 toward the advance side. Thereby, the camshaft 55 fixed to the rotor 95 rotates, so that the valve timing changes toward the advance side. On the other hand, when a volume of the retard chamber S2 is increased by the hydraulic pressure, the rotor 95 is rotated relative to the case 92 toward the retard side. Thereby, the camshaft 55 fixed to the rotor 95 rotates, so that the valve timing changes toward the retard side.

The variable valve timing device 91 is configured to operate by the hydraulic pressure from the oil control valve unit 61. The oil is pumped up from an oil pan 51 to the main gallery 53 via a filter and the like by the oil pump 52, and the oil is supplied to the intake control valve 62 and the exhaust control valve 63 of the oil control valve unit 61 through the external piping 81. Then, the communication states between the intake control valve 62 and exhaust control valve 63 and the ports of the advance port, the retard port, the input port and the exhaust port are switched, so that the variable valve timing is switched to the advance side or retard side.

At this time, the oil is pumped up from the oil pan 51 to the main gallery 53 by the oil pump 52, so that the oil of high hydraulic pressure is supplied from the main gallery 53 to the oil control valve unit 61 through the external piping 81. Since the external piping 81 passes outside the engine, it is not connected to the other hydraulic pressure circuit such as the oil passage in the engine, and the pressure loss of the oil in the external piping 81 is suppressed. By the external piping 81 passing outside the engine, the oil is delivered with high hydraulic pressure up to the vicinity of the variable valve timing devices 91, so that the oil is supplied from the oil control valve unit 61 into the engine.

Since the oil control valve unit 61 is mounted in the vicinity of the variable valve timing devices 91, the oil passage in the engine is shortened, so that the pressure loss of the oil in the oil passage is reduced. Therefore, the oil is supplied from the intake control valve 62 and the exhaust control valve 63 to the intake-side and exhaust-side variable valve timing devices 91 with high hydraulic pressure, so that operating speeds of the variable valve timing devices 91 are increased. Also, it is possible to effectively use the dead space inside the cam chain 56 as the oil passage of the oil control valve unit 61, so that the oil passage in the engine is not complex.

Figure 10:
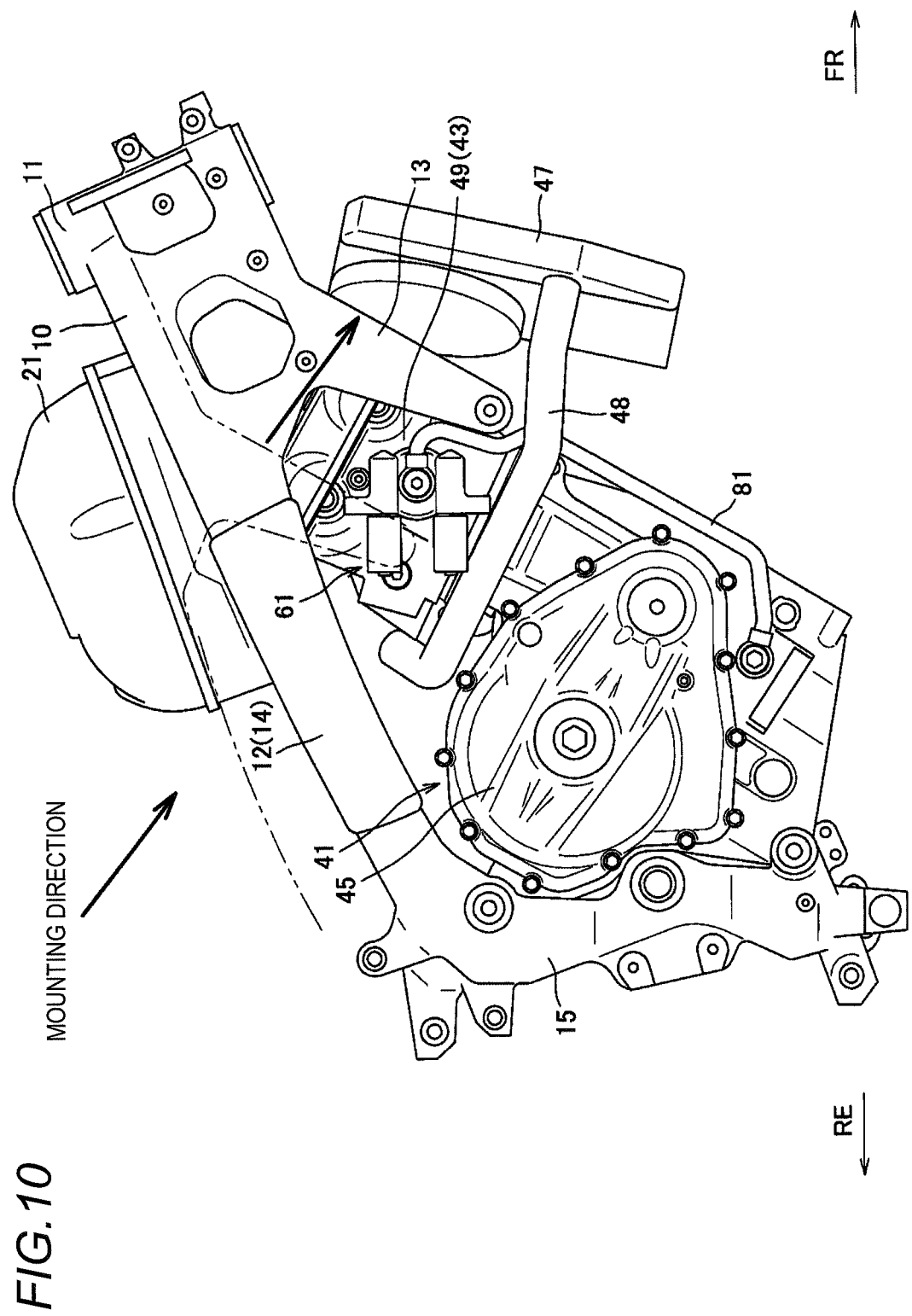
FIG. 10 depicts an example of an operation of mounting a vehicle body frame of the illustrative embodiment.
Figure 11:
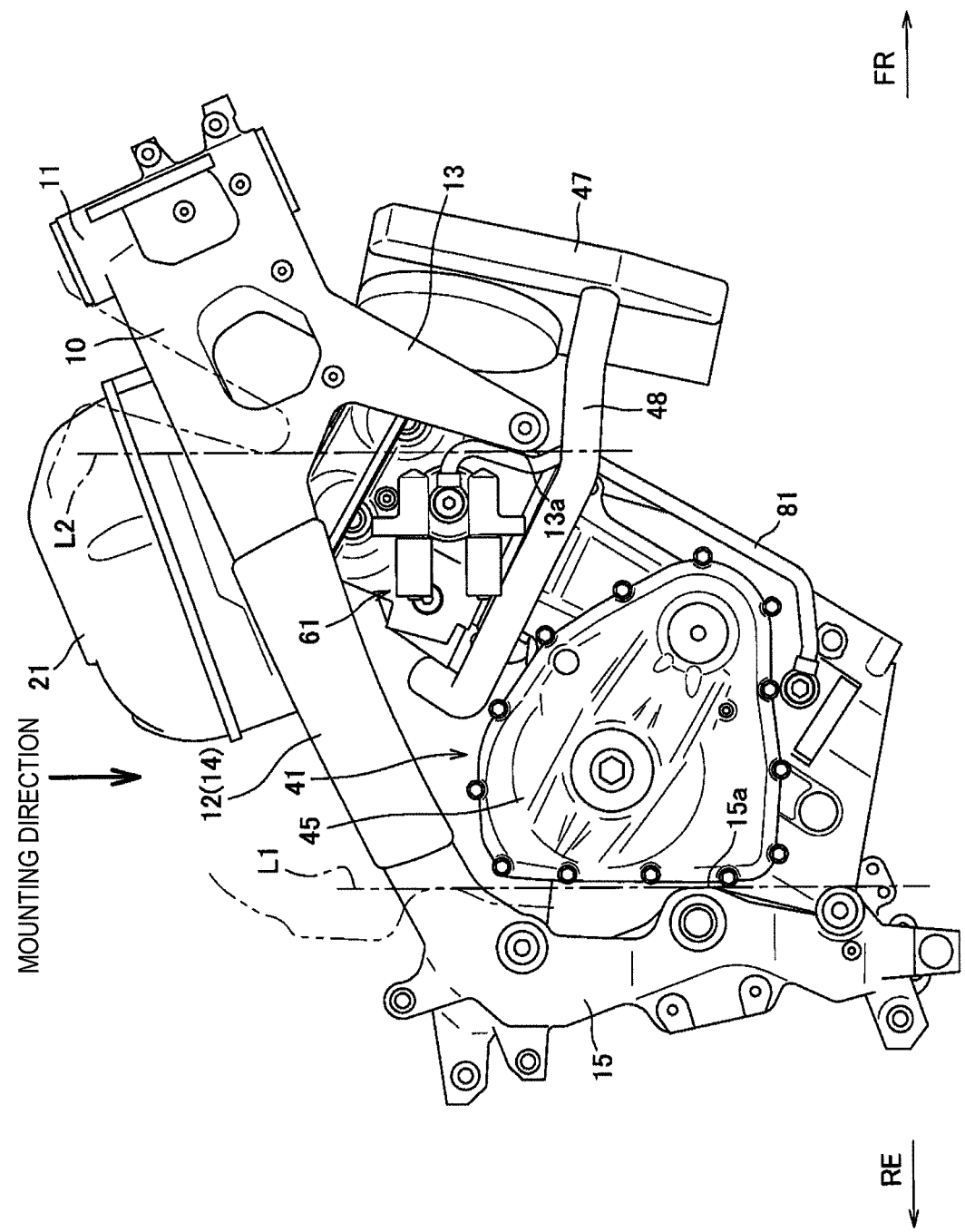
FIG. 11 depicts another example of the operation of mounting the vehicle body frame of the illustrative embodiment.

Subsequently, an operation of mounting the vehicle body frame is described with reference to FIGS. 10 and 11. FIG. 10 depicts an example of an operation of mounting the vehicle body frame of the illustrative embodiment. FIG. 11 depicts another example of the operation of mounting the vehicle body frame of the illustrative embodiment.

As shown in FIG. 10, the mounting space 49 of the oil control valve unit 61 exists on a moving locus upon mounting of the vehicle body frame 10. The transmission cover 45 bulges from a side of the engine 41, and a rear part of the vehicle body frame 10 is formed with the body frame 15 (the rear part of the main frame) so as to surround (so as to turn around rearward) a part of the bulging part of the transmission cover 45 from the rear. Also, the front part of the vehicle body frame 10 is bifurcated into the main frame 12 and the down frame 13, and the mounting space 49 of the oil control valve unit 61 is secured so that the oil control valve unit 61 is positioned between the main frame 12 and the down frame 13.

In this case, the vehicle body frame 10 is mounted to the engine 41 in an oblique direction shown with an arrow so that the main frame 12 does not interfere with the bulging part of the transmission cover 45. However, upon the mounting of the vehicle body frame 10, since the mounting space 49 of the oil control valve unit 61 exists on the moving locus of the down frame 13 shown with the dashed-two dotted line, the vehicle body frame 10 interferes with the oil control valve unit 61. For this reason, in the illustrative embodiment, the oil control valve unit 61 is detachably mounted to the outer surface of the engine 41 avoiding the vehicle body frame 10. After the vehicle body frame 10 is mounted to the engine 41 while suppressing the interference of the main frame 12 with the transmission cover 45, the oil control valve unit 61 can be mounted from a side of the cylinder 43.

Thereby, it is possible to suppress the interference between the vehicle body frame 10 and the oil control valve unit 61, so that a degree of mounting freedom of the oil control valve unit 61 is secured. Meanwhile, in the illustrative embodiment, after mounting the vehicle body frame 10 to the engine 41, the oil control valve unit 61 is mounted to the side surface of the cylinder 43. However, the present invention is not limited thereto. When there is the mounting space 49 of the oil control valve unit 61 so as to avoid the moving locus of the vehicle body frame 10, the vehicle body frame 10 may be mounted in a state where the oil control valve unit 61 is mounted to the side surface of the cylinder 43.

For example, as shown in FIG. 11, the oil control valve unit 61 and the bulging part of the transmission cover 45 are mounted between a forefront part 15a of the body frame 15 below the transmission cover 45 and a last part 13a of the down frame 13, in the front and rear direction of the vehicle body. When the vehicle body frame 10 is downward mounted from the upper of the engine 41 in the vertical direction, moving loci L1, L2 are depicted by the forefront part 15a of the body frame 15 and the last part 13a of the down frame 13. Since the moving loci L1, L2 deviate from the oil control valve unit 61 and the transmission cover 45, it is possible to mount the vehicle body frame 10 to the engine 41 in the state where the oil control valve unit 61 is mounted to the side surface of the cylinder 43.

As described above, according to the illustrative embodiment, the down frame 13, which is a part of the vehicle body frame 10, is positioned between the radiator 47 and the oil control valve unit 61, and the heat from the radiator 47 is shielded by the down frame 13, so that the deterioration of the operation characteristics of the oil control valve unit 61 due to the increase in temperature is suppressed. Also, the oil control valve unit 61 is protected from the flying stones in front of the vehicle body by the down frame 13.

In the meantime, in the illustrative embodiment, the parallel four-cylinder engine has been exemplified as the engine. However, the present invention is not limited thereto. The configuration of the engine is not particularly limited. For example, the engine may also be a single cylinder engine, a parallel two-cylinder engine, a V-shaped engine, a horizontal opposed type engine, an in-line two-cylinder engine, or the like.

Also, in the illustrative embodiment, the twin spar frame has been exemplified as the vehicle body frame. However, the present invention is not limited thereto. The vehicle body frame may have any shape capable of securing the mounting space of the oil control valve unit for the engine. For example, the vehicle body frame may be configured by a cradle frame.

Also, in the illustrative embodiment, the oil control valve unit is mounted to the right side of the engine. However, the oil control valve unit may be mounted to the left side of the engine.

Also, in the illustrative embodiment, the radiator has been exemplified as the heat exchanger. However, the present invention is not limited thereto. The heat exchanger may be any configuration capable of radiate the heat carried by the liquid such as cooling water and oil, in front of the engine. For example, the heat exchanger may be configured by an oil cooler, or a radiator and an oil cooler.

Also, in the illustrative embodiment, the oil control valve unit is mounted at the side of the cylinder. However, the present invention is not limited thereto. The oil control valve unit has only to be mounted at the side of the engine. For example, the oil control valve unit may be mounted at a side of the engine case.

Also, in the illustrative embodiment, the oil control valve unit overlaps the down frame, as seen from the front and rear direction. However, the present invention is not limited thereto. The oil control valve unit preferably overlaps the down frame, as seen from the front and rear direction. However, the oil control valve unit may not overlap the down frame, as seen from the front and rear direction.

Also, in the illustrative embodiment, the facing interval between the pair of right and left main frames is narrowed at the rear of the oil control valve unit, so that the air can easily flow to the rear of the oil control valve unit. However, the present invention is not limited thereto. For example, the oil control valve unit may not be exposed, as seen from the rear, inasmuch as the oil control valve unit can be sufficiently cooled.

Also, in the illustrative embodiment, the oil control valve unit overlaps the main frame, as seen from the front and rear direction. However, the present invention is not limited thereto. The oil control valve unit preferably overlaps the main frame, as seen from the front and rear direction. However, the oil control valve unit may not overlap the main frame, as seen from the front and rear direction.

Also, in the illustrative embodiment, the down frame is configured to support the front side of the engine. However, the present invention is not limited thereto. The support position of the down frame to the engine is not particularly limited inasmuch as it is possible to secure the mounting space of the oil control valve unit for the engine.

Also, in the illustrative embodiment, the width of the down frame is widened in the front and rear direction from the support position of the engine toward the head pipe. However, the present invention is not limited thereto. That is, the shape of the down frame is not particularly limited.

Also, in the illustrative embodiment, the solenoid valve has been exemplified as the oil control valve unit. However, the present invention is not limited thereto. The oil control valve unit may have any configuration capable of controlling the hydraulic pressure to the variable timing device of the engine. That is, the type of the valve is not particularly limited.

Also, in the illustrative embodiment, the down frame passes through the front side of the EX cam axis center, and the main frame passes through the rear side of the IN cam axis center. However, the present invention is not limited thereto. For example, the down frame may be configured to pass through a rear side of the EX cam axis center, and the main frame may be configured to pass through a front side of the IN cam axis center, inasmuch as it is possible to secure the mounting space of the oil control valve unit at the side of the engine.

Also, in the illustrative embodiment, the oil control valve unit includes the intake control valve and the exhaust control valve. However, the present invention is not limited thereto. For example, the oil control valve unit may include any one of the intake control valve and the exhaust control valve.

Also, in the illustrative embodiment, the intake control valve and the exhaust control valve are vertically spaced from each other with horizontal postures. However, the present invention is not limited thereto. For example, the intake control valve and the exhaust control valve are preferably vertically spaced from each other with horizontal posture but the postures and mounting places of the intake control valve and the exhaust control valve are not particularly limited.

Also, in the illustrative embodiment, the radiator hose extends rearward from the radiator. However, the present invention is not limited thereto. For example, the radiator hose may be mounted so as to avoid the oil control valve unit, and the mounting route of the radiator hose is not particularly limited.

Also, in the illustrative embodiment, the radiator hose has been exemplified as the hose extending from the heat exchanger. However, the present invention is not limited thereto. For example, when the heat exchanger is an oil cooler or the like, an oil hose may be used as the hose.

Also, in the illustrative embodiment, the oil control valve unit and the main gallery are connected by one external piping. However, the present invention is not limited thereto. The oil control valve unit and the main gallery may be connected by a plurality of external pipings. For example, the external pipings may be connected to each of the intake control valve and the exhaust control valve.

Also, in the illustrative embodiment, the mounting route of the external piping is not particularly limited. The external piping may have any configuration capable of connecting the oil control valve unit and the main gallery.

Also, in the illustrative embodiment, the external piping overlaps the down frame, as seen from the front and rear direction. However, the present invention is not limited thereto. The external piping preferably overlaps the down frame, as seen from the front and rear direction. However, the external piping may not overlap the down frame, as seen from the front and rear direction.

Also, in the illustrative embodiment, the external piping overlaps the main frame, as seen from the front and rear direction. However, the present invention is not limited thereto. The external piping preferably overlaps the main frame, as seen from the front and rear direction. However, the external piping may not overlap the main frame, as seen from the front and rear direction.

Also, in the illustrative embodiment, the external piping is configured to pass the inner side of the radiator hose. However, the present invention is not limited thereto. The external piping may have any configuration capable of connecting the oil control valve unit and the main gallery, and may be configured to pass through an outer side of the radiator hose.

Also, in the illustrative embodiment, the upper part of the transmission cover is inclined so that the interval with the oil control valve unit becomes wider forward. However, the present invention is not limited thereto. The upper part of the transmission cover may have any shape capable of securing the mounting space of the oil control valve unit.

Also, in the illustrative embodiment, the oil control valve unit is mounted at the inner side than the transmission cover, the main frame and the down frame, as seen from the front and rear direction. However, the present invention is not limited thereto. The oil control valve unit may be mounted at the more inner side than any one of the transmission cover, the main frame and the down frame, as seen from the front and rear direction.

Also, in the illustrative embodiment, the shape of the valve housing is not particularly limited. That is, the valve housing may have any shape capable of supplying the oil in the external piping to the variable valve timing device.

Also, in the illustrative embodiment, the valve housing and the banjo joint, which is a circular ring-shaped joint, are together fastened to the cylinder by the bolt. However, the method of fastening the valve housing and the banjo joint is not particularly limited.

Also, in the illustrative embodiment, the external piping is connected to the valve housing via the banjo joint provided at the leading end of the external piping. However, the present invention is not limited thereto. For example, the external piping may be connected to the valve housing by inserting the external piping into the valve housing.

Also, in the illustrative embodiment, the valve housing is formed with the guide surfaces configured to guide the banjo joint to the valve housing so that the mounting hole of the banjo joint coincides with the opening of the valve housing. However, the present invention is not limited thereto. For example, the valve housing may not be formed with the guide surfaces.

Also, in the illustrative embodiment, the banjo joint is mounted at the more inner side than the main frame, the down frame and the transmission cover, as seen from the front and rear direction. However, the present invention is not limited thereto. The banjo joint is preferably mounted at the more inner side than the main frame, the down frame and the transmission cover, as seen from the front and rear direction. However, the banjo joint may be mounted at a more outer side than the main frame, the down frame and the transmission cover, as seen from the front and rear direction.

Although the respective illustrative embodiments of the present invention have been described, the other illustrative embodiments of the present invention obtained by entirely or partially combining the illustrative embodiment and modified embodiments are also possible.

Also, the illustrative embodiment of the present invention is not limited to the above-described illustrative embodiment, and can be diversely changed, replaced and modified without departing from the technical spirit of the present invention. Also, when the technical spirit of the present invention can be implemented with other methods by advance in technology or by the other deriving technology, the present invention can be implemented using the methods. Therefore, the claims cover all implementations that can be included in the technical spirit of the present invention.

Also, in the illustrative embodiment, the present invention has been applied to the motorcycle. However, the present invention is not limited thereto. That is, the present invention can be appropriately applied to the other vehicles having the oil control valve unit mounted thereto, for example, a special machine such as a jet ski bike, a lawn trimmer, an outboard motor and the like, in addition to an automatic four-wheeled vehicle and a buggy-type motor tricycle.

In the below, features of the illustrative embodiment of the present invention are summarized.

The mounting structure of the oil control valve unit described in the illustrative embodiment is a mounting structure of an oil control valve unit configured to control a hydraulic pressure to a variable valve timing device of an engine, wherein the engine is supported by a vehicle body frame, wherein a heat exchanger is mounted in front of the engine, wherein the oil control valve unit is mounted at a side of the engine, and wherein a part of the vehicle body frame is arranged between the oil control valve unit and the heat exchanger in a front and rear direction. According to this configuration, the part of the vehicle body frame is positioned between the heat exchanger and the oil control valve unit, and heat from the heat exchanger is shielded by the part of the vehicle body frame, so that deterioration of operation characteristics of the oil control valve unit due to an increase in temperature is suppressed. Also, the oil control valve unit is protected from flying stones in front of a vehicle body by the part of the vehicle body frame.

In the mounting structure of the oil control valve unit described in the illustrative embodiment, preferably, the oil control valve unit overlaps the part of the vehicle body frame, as seen from the front and rear direction. According to this configuration, since the front of the oil control valve unit is covered by the part of the vehicle body frame, the heat shield effect by the vehicle body frame is increased, and the oil control valve unit is effectively protected from flying stones in front of the vehicle body.

In the mounting structure of the oil control valve unit described in the illustrative embodiment, preferably, the vehicle body frame includes a pair of right and left main frames extending rearward from a head pipe, and a pair of right and left down frames extending downward from the head pipe, and the oil control valve unit is mounted in a mounting space between the main frames and the down frames. According to this configuration, it is possible to effectively use a space between the main frames and the down frames, as the mounting space of the oil control valve unit. Also, the oil control valve unit is protected from flying stones by the main frames and the down frames.

In the mounting structure of the oil control valve unit described in the illustrative embodiment, preferably, the pair of right and left main frames extends obliquely downward from the head pipe toward the rear, and a facing interval between the pair of right and left main frames is narrowed at the rear of the mounting space of the oil control valve unit, so that the oil control valve unit is exposed, as seen from the rear. According to this configuration, the air flow is not hindered at the rear of the oil control valve unit, so that the heat is not retained in the mounting space of the oil control valve unit. Therefore, the oil control valve unit is effectively cooled upon traveling.

In the mounting structure of the oil control valve unit described in the illustrative embodiment, preferably, the oil control valve unit overlaps the main frame, as seen from above. According to this configuration, the main frame functions as a rain shelter, so that a damage of the oil control valve unit due to the rainwater is prevented.

In the mounting structure of the oil control valve unit described in the illustrative embodiment, preferably, the down frames are configured to support a front side of the engine. According to this configuration, the oil control valve unit and the down frame are spaced, so that the heat is difficult to be retained in the mounting space of the oil control valve unit and a surrounding temperature of the mounting space can be lowered.

In the mounting structure of the oil control valve unit described in the illustrative embodiment, preferably, the down frames are configured to support a front side of a cylinder of the engine, a width of each down frame is formed to be wider in the front and rear direction from a support position of the cylinder toward the head pipe, and the oil control valve unit is mounted in the mounting space between the main frame and the down frame at a side of the cylinder. According to this configuration, even when the width of the down frame is formed to be wider in the front and rear direction from the support position of the cylinder toward the head pipe, it is possible to secure the mounting space of the oil control valve unit at the side of the cylinder.

In the mounting structure of the oil control valve unit described in the illustrative embodiment, preferably, the oil control valve unit includes a solenoid valve, and a solenoid-side of the solenoid valve faces rearward. According to this configuration, since the solenoid is spaced from a radiator, the deterioration of operation characteristics of the oil control valve unit due to an increase in temperature of the solenoid is suppressed.

In the mounting structure of the oil control valve unit described in the illustrative embodiment, preferably, an axis center of the solenoid faces horizontally or obliquely upward toward the rear. According to this configuration, foreign matters such as contaminations and the like are difficult to be deposited on the solenoid, so that a damage of the solenoid is prevented.

In the mounting structure of the oil control valve unit described in the illustrative embodiment, preferably, the solenoid of the solenoid valve is spaced from a side surface of the engine in a vehicle width direction. According to this configuration, the solenoid of the oil control valve unit is spaced from a side surface of the cylinder, so that an increase in temperature of the solenoid due to the heat of the cylinder is suppressed.

In the mounting structure of the oil control valve unit described in the illustrative embodiment, preferably, the engine includes a pair of front and rear camshafts, the down frames are configured to pass through a front side of an axis center of the front camshaft, and the main frames are configured to pass through a rear side of an axis center of the rear camshaft. According to this configuration, the mounting space of the oil control valve unit is largely secured, so that the heat is difficult to be retained in the mounting space and the surrounding temperature of the mounting space can be thus lowered.

In the mounting structure of the oil control valve unit described in the illustrative embodiment, preferably, the engine is provided with a transmission, a transmission cover configured to cover the transmission from a side is formed with a bulging part bulging laterally, the main frame has a rear part of the main frame configured to surround a part of the bulging part from the rear, and the oil control valve unit and the bulging part are arranged between a forefront part of the rear part of the main frame below the bulging part and a last part of the down frame, in the front and rear direction of a vehicle body. According to this configuration, it is possible to mount the vehicle body frame to the engine in a state where the oil control valve unit is mounted to the side surface of the cylinder.

In the mounting structure of the oil control valve unit described in the illustrative embodiment, preferably, the oil control valve unit includes an intake control valve configured to control an intake-side valve timing and an exhaust control valve configured to control an exhaust-side valve timing. According to this configuration, deterioration of operation characteristics of the intake control valve and the exhaust control valve due to the increase in temperature is suppressed, and the intake control valve and the exhaust control valve are protected from the flying stones in front of the vehicle body.

In the mounting structure of the oil control valve unit described in the illustrative embodiment, preferably, the intake control valve and the exhaust control valve are spaced from each other with a connection part of an external piping for oil supply being interposed therebetween. According to this configuration, the heat is difficult to be retained between the intake control valve and the exhaust control valve, so that it is possible to lower the surrounding temperature of the mounting space of the oil control valve unit.

In the mounting structure of the oil control valve unit described in the illustrative embodiment, preferably, the intake control valve and the exhaust control valve are vertically spaced from each other with horizontal postures with the connection part being interposed therebetween. According to this configuration, since the intake control valve and the exhaust control valve are vertically aligned, an increase in vehicle width dimension of a main body of the vehicle body is suppressed. Also, since the intake control valve and the exhaust control valve are longitudinally aligned with horizontal postures, both the control valves are evenly cooled by the air flow upon the traveling.

In the mounting structure of the oil control valve unit described in the illustrative embodiment, preferably, the heat exchanger is a radiator, a radiator hose configured to deliver cooling water from the radiator to the engine extends rearward from the radiator, and the oil control valve unit is mounted above the radiator hose. According to this configuration, the oil control valve unit is cooled by the cooling water in the radiator hose. Also, the oil control valve unit is protected from the flying stones below the vehicle body by the hose.

The motorcycle described in the illustrative embodiment includes the mounting structure of the oil control valve unit. According to this configuration, it is possible to precisely control the hydraulic pressure to the variable valve timing device of the motorcycle by the oil control valve unit of which the deterioration of operation characteristics is suppressed and which is protected from the flying stones in front of the vehicle body.

What is claimed is:

1. A motorcycle comprising:
   a vehicle body frame;
   an engine with a variable valve timing device, the engine supported by the vehicle body frame; and
   an oil control valve unit configured to control a hydraulic pressure to the variable valve timing device of the engine,
   wherein a heat exchanger is mounted in front of the engine,
   wherein the oil control valve unit is mounted at a side of the engine,
   wherein a part of the vehicle body frame is arranged between the oil control valve unit and the heat exchanger in a front and rear direction of the motorcycle,
   wherein the vehicle body frame comprises a pair of right and left main frames extending rearward from a head pipe, and a pair of right and left down frames extending downward from the head pipe, and wherein the oil control valve unit is mounted in a mounting space between the main frames and the down frames.

2. The motorcycle according to claim 1, wherein the oil control valve unit overlaps the part of the vehicle body frame, as seen from the front and rear direction.

3. The motorcycle according to claim 1,
wherein the pair of right and left main frames extends obliquely downward from the head pipe toward the rear, and
wherein a facing interval between the pair of right and left main frames is narrowed at the rear of the mounting space of the oil control valve unit, so that the oil control valve unit is exposed, as seen from the rear.

4. The motorcycle according to claim 1, wherein the oil control valve unit overlaps the main frame, as seen from above.

5. The motorcycle according to claim 1, wherein the down frames are configured to support a front side of the engine.

6. The motorcycle according to claim 1,
wherein the down frames are configured to support a front side of a cylinder of the engine, and a width of each down frame is formed to be wider in the front and rear direction from a support position of the cylinder toward the head pipe, and
wherein the oil control valve unit is mounted in the mounting space between the main frame and the down frame at a side of the cylinder.

7. The motorcycle according to claim 1,
wherein the oil control valve unit comprises a solenoid valve, and
wherein a solenoid-side of the solenoid valve faces rearward.

8. The motorcycle according to claim 7, wherein an axis center of the solenoid faces horizontally or obliquely upward toward the rear.

9. The motorcycle according to claim 7, wherein the solenoid of the solenoid valve is spaced from a side surface of the engine in a vehicle width direction of the motorcycle.

10. The motorcycle according to claim 1,
wherein the engine comprises a pair of front and rear camshafts, and
wherein the down frames are configured to pass through a front side of an axis center of the front camshaft, and the main frames are configured to pass through a rear side of an axis center of the rear camshaft.

11. The motorcycle according to claim 1,
wherein the engine is provided with a transmission,
wherein a transmission cover configured to cover the transmission from a side is formed with a bulging part bulging laterally,
wherein the main frame has a rear part configured to surround a part of the bulging part from the rear, and
wherein the oil control valve unit and the bulging part are arranged between a forefront part of the rear part of the main frame below the bulging part and a last part of the down frame, in the front and rear direction.

12. The motorcycle according to claim 1, wherein the oil control valve unit comprises an intake control valve configured to control an intake-side valve timing and an exhaust control valve configured to control an exhaust-side valve timing.

13. The motorcycle according to claim 12, wherein the intake control valve and the exhaust control valve are spaced from each other with a connection part of an external piping for oil supply being interposed therebetween.

14. The motorcycle according to claim 13, wherein the intake control valve and the exhaust control valve are vertically spaced from each other with horizontal postures with the connection part being interposed therebetween.

15. The motorcycle according to claim 1,
wherein the heat exchanger is a radiator,
wherein a radiator hose configured to deliver cooling water from the radiator to the engine extends rearward from the radiator, and
wherein the oil control valve unit is mounted above the radiator hose.

* * * * *